United States Patent [19]

Lane et al.

[11] Patent Number: 5,502,718
[45] Date of Patent: Mar. 26, 1996

[54] DEVICE FOR SWITCHING HIGH SPEED PROTOCOL UNITS, AND CORRESPONDING SWITCHING PROCEDURE

[75] Inventors: Thao Lane, Cesson Sevigne; Didier Mallorey, Chevaigne, both of France

[73] Assignee: Quest Standard Telematique S.A., Cesson Sevigne, France

[21] Appl. No.: 305,263

[22] Filed: Sep. 13, 1994

[30] Foreign Application Priority Data

Sep. 13, 1993 [FR] France .................................. 93 11071

[51] Int. Cl.$^6$ .............................. H04Q 11/04; H04J 3/02
[52] U.S. Cl. ....................... 370/58.2; 370/60.1; 370/85.2; 370/85.13; 370/94.2
[58] Field of Search .................................. 370/58.1, 58.2, 370/58.3, 85.13, 85.9, 94.1, 60, 61, 60.1, 68.1, 58.1, 58.2, 58.3, 85.1, 68.1, 85.2, 94.2; 340/825.79, 825.89

[56] References Cited

U.S. PATENT DOCUMENTS

| 5,088,091 | 2/1992 | Schroeder et al. | 370/85.13 |
| 5,157,654 | 10/1992 | Cisneros | 370/60 |
| 5,317,565 | 5/1994 | Crouse et al. | 370/58.2 |
| 5,345,447 | 9/1994 | Noel | 370/85.13 |

OTHER PUBLICATIONS

"High Speed Transport Processor for Broad–Band Burst Transport System", H. Obara, T. Yasushi; *IEEE International Conference on Communications '88*, New York, 1988; pp. 922–927.

"Performance Analysis of Packet–Switched Multiple–bus Multiprocessor Systems", Q. Yang, L. N. Bhuyan, and R. Pavaskar; *Proceedings, Real–Time Systems Symposium*, San Jose, CA, Dec. 1987; pp. 170–178.

Preliminary Search Report in the French Patent Office re: French Application No. 93 11071, dated 31 May 1994.

DuBois and Rasure, "Design and Evaluation of a Distributed Asynchronous VLSI Crossbar Switch Controller for a Packet Switched Supercomputer Network", *Computer Architecture News*, Jun. 1991, pp. 69–79.

*Primary Examiner*—Alpus Hsu
*Assistant Examiner*—Ricky Q. Ngo
*Attorney, Agent, or Firm*—Merchant, Gould, Smith, Edell, Welter & Schmidt

[57] ABSTRACT

A high speed switching device among a multiplicity of processing modules, for enabling data exchanges of data organized into protocol units, includes a multiplicity of switching interface modules each including an FIFO input memory connected to an input bus and an FIFO output bus, a switching module capable of connecting each of the input buses with each of the output buses, and an arbitration and command module for commanding the switching effected by the switching module. The arbitration and command module commands switching once the destination switching interface module has at least one free space.

13 Claims, 4 Drawing Sheets

DEVICE FOR SWITCHING HIGH SPEED PROTOCOL UNITS, AND CORRESPONDING SWITCHING PROCEDURE

BACKGROUND OF THE INVENTION

The field of application of the invention concerns high speed data exchange (in the order of several megabyte/s) among a multiplicity of data processing modules. More precisely, the invention concerns structured transmission systems in which communication between the two processing modules is effected by exchanges of protocol data units (or PDU).

By processing module is understood any type of equipment likely to transmit or receive data, such as an electronic card, a terminal, even a local network segment.

The invention may be applied in particular to all packet transmission systems (system implementing a level 3 procedure, according to the seven level OSI standardisation model), but also to transmission by frame (level 2) or transport protocol data units (level 4). More generally, the invention may be applied to any type of transmission system of whatever level (in accordance with the terminology of the OSI standards) of the communication protocol associated with the system in question.

A special field of application of the invention is that of wide band systems, and especially the ATM networks (Asynchronous Transfer Mode (asynchronous transfer method)). In fact, from a technological point of view, the trend towards high speeds would seem to favour the ATM technique, and more generally the 'fast packet' technologies', as opposed to the traditional TDM (Time Division Multiplex (multiplexing by division of time)).

The majority of known techniques enable structured data exchange at high speed based on the use of a single shared bus, access to the bus being controlled by algorithms of varying degrees of complexity. These techniques are known under the generic term of timed switching.

Crossbar switching is an alternative to timed switching.

This method is currently implemented in low speed exchange systems, and especially in classic telephone communication (switched telephone network, or RTC). In these systems, a fixed itinerary is allocated to a communication, using means of switching, generally called switching matrices. Classically, a switching matrix enables any input line to be linked with any output line.

In general, crossbar switching techniques are limited to low or average speed applications (below 2 Mb/s) and/or require a single physical line to be reserved for a relatively long period. In fact, they are penalized, in the first analysis, firstly by arbitration problems, especially when two modules want to simultaneously transmit data to the same destination module, and secondly, by problems in arbitration and switching time in making a connection. These two inconveniences would seem to be incompatible with very high speed exchange packet applications.

However, work has been carried out in this field. It is thus that the document 'Design and Evaluation of a Distributed Asynchronous VLSI Crossbar Switch Controller for a Packet Switched Supercompter Network' (DuBois and Rasure, Computer Architecture News, June 1991), presents packet switch nodes implementing crossbar matrices for high speed exchanges. This system has proved to be particularly complex, especially regarding arbitration between different requests.

In effect it calls on a distributed arbitration technique, each module capable of transmitting or distributing data including its own means of arbitration ('DACC'). Each of these means of arbitration must therefore be linked independently to all of the other processing modules likely to want to send it data by means of a parallel bus (for example, on 8 bits). Once the number of these modules increases, the system becomes very complex, especially in relation to connections.

It is not difficult to imagine that such a technique, which would seem necessary to function at very high speed, will lead to complex system architecture, and therefore to high manufacture and running costs. This complexity limits the use of such systems with 'supercompter' networks.

Furthermore, the already known switching systems are generally handicapped by blockages due to the unavailability of the destination processing module. In effect, each processing module places the data to be transmitted in an FIFO memory. When data has to be switched to an exit already engaged in a transfer, the transmitting module has to wait until transfer is possible. Subsequent data also has to wait, even if their destination exit is free.

The consequence of this phenomenon, called 'HOL (Head of Line) blocking' is to reduce the overall output of the switch.

SUMMARY OF THE INVENTION

The aim of the invention is, in particular, to compensate for these inconveniences in prior art.

More precisely, an initial objective of the invention is to supply a switching device among several processing modules ensuring crossbar switching of packets, and more generally, high output protocol units.

A particular aim of the invention is, especially, to provide such a device, capable of functioning at more than one hundred V per second.

The invention also aims to provide such a device, in which the risks of blocking are reduced and in which the duration of these blockages is limited in relation to already known systems.

A further aim of the invention is to supply such a device, the purchase and running cost of which will be lower than already known switching systems (timed or crossbar).

Another aim of the invention is to provide such a device capable of simultaneously transmitting any type of data (images, sound, data, . . . ) at varying speeds and with varied and variable protocol units A particular aim of the invention is also to enable data exchange for average speed applications.

A further aim of the invention is also to provide such a device taking account of the constraints of an industrial product. Apart from low production cost, this implies simplified industrialization, use (as far as possible) of components already available on the market, easy and limited installation and maintenance, safe operation (even in the event of failure of a component), limited bulk, . . .

These aims, as well as others which will be discussed later, are fulfilled according to the invention using a high speed switching device within a multiplicity of processing modules, enabling the exchange of data organized into protocol units, including:

a multiplicity of interface switch modules each including
a FIFO input memory connected to an input bus and a
FIFO output memory connected to an output bus, each of the memories including at least one space able to house a protocol unit, and means of controlling data exchanges, each of the interface switch modules being capable of being connected to one of the processing modules, in such a way that the processing module can inscribe data in the said input memory and read data in the output memory;

a switching module, being capable of connecting each of the input buses to each of the output buses;

an arbitration and command module, controlling the switching effected by the switching module, depending on the requests received from the means of controlling data exchanges in the interface switch modules, and issuing corresponding connection commands to the means of controlling during switching, the means of controlling data exchanges in one interface switch module transmitting a request, indicating at least one destination interface switch module, to the arbitration and command module as soon as a protocol unit is inscribed in the input memory, and the arbitration and command module controlling the corresponding switching as soon as the output memory of the destination interface switch module has at least one free space.

The presence of FIFO memories at the input and output of switching devices reduces the risk of these switching devices becoming blocked. In fact, the output memory authorizes transfers of one unit of data to a processing module even if the latter has not finished processing the previous data unit.

Preferably, each of the interface modules will be linked to the said arbitration and command module by:

an input connection bus, on which the arbitration and command module will indicate an interface switch module which has issued a request from a transfer which the corresponding switching has effected;

an output connection bus, on which the arbitration and command module indicates to a destination switching interface module that it is going to receive a protocol unit; and a release bus, on which the interface switch module indicates to the arbitration and command unit that the protocol module has been received; and a requests bus, on which the interface switch module issues a request, including the address of an interface switch module, to the arbitration module.

These buses are mono-directional, which simplifies operation of the arbitration module.

To its advantage, the requests bus is composed of a single wire, along which the binary elements which make up the request are transmitted in series.

This solution enables connections to be considerably reduced in relation to parallel techniques. On the other hand, it involves considerably longer transmission times, which has led specialists to consider it as being incompatible with high speed applications.

To its advantage, in order to compensate for this inconvenience, the arbitration and command module implements a pipeline processing procedure, arbitration of one switching action of a current protocol unit being effected simultaneously with the transfer of a preceding protocol unit.

In this instance, time is advantageously divided into switching cycles, the duration of one cycle corresponding to the duration of protocol unit of predetermined size, and in that the arbitration and command module effects the following operations successively during the cycle corresponding to the transfer of the protocol unit:

receipt of requests;

arbitration of connections for the following cycle;

transmission of switching commands for the following cycle in accordance with the switching module;

validation of the switching commands.

This technique enables fixed size packets to be exchanged, also enabling exchange of packets of variable length when necessary.

To its advantage, each of the processing modules is implanted on a distinct switching interface support card and the switching module is implanted on a switching support card, the support cards being grouped in such a way that the distances between each of the switching interface support cards and the switching support cards being almost identical.

Thus, the transfer times are almost identical, whichever processing modules are involved.

For example, the switching interface support cards may be positioned more or less parallel to each other, and the switching support card placed perpendicular to the switching interface support cards.

The invention also pertains to a high speed switching procedure among a multiplicity of processing modules, enabling exchanges of data organized into protocol units, including the following stages:

writing a protocol unit to be transmitted by a transmitting processing module of into an FIFO input memory of an initial interface switch module linked to the transmitting processing module by the transmitting processing module;

transmitting a connection request which specifies an address of a destination processing module to a single arbitration and command module;

if the destination processing module is available, controlling a switching module by the arbitration and command module, in such a way that the switching module ensures the connection of an input bus connected to the FIFO input memory to an output bus connected to an FIFO output memory in a second KDD interface module linked to the destination processing module;

transmitting a transfer command to the transmitting processing modules by the arbitration and command module;

transferring the protocol unit in the said output memory;

transmitting release information by the second interface switch module to the arbitration and command module, when the transfer is effected and when there is sufficient space in the said output memory for at least one protocol unit.

This procedure should preferably implement a pipeline processing procedure, arbitration of the switching of a current protocol unit being effected simultaneously to the transfer of a preceding protocol unit.

To its advantage, time is divided into switching cycles, the duration of a cycle corresponding to the duration of a protocol unit of predetermined size or segment.

To its advantage, each segment bears information indicating whether or not the last segment in a series of segments forming a protocol unit, a connection being systematically maintained for the following cycle when the segment currently being transferred is not the last segment and release information being transmitted only when the last segment has been received and when the output memory has sufficient space to receive a new protocol unit.

BRIEF DESCRIPTION OF THE DRAWINGS

Other characteristics and advantages of the invention will be revealed in the following description of a preferential set of the system in the invention given as an unrestrictive illustration, and in the attached diagrams in which.

DETAILED DESCRIPTION OF THE PREFERRED EMBODIMENT

Therefore, the invention relates to a device for switching protocol data units for applications operating at high speed. The preferential example described below relates more specifically to the switching of packets. However, it is clear that the invention may be implemented at all protocol levels of OSI standards, especially at level 2 and/or level 4.

Figure 1:
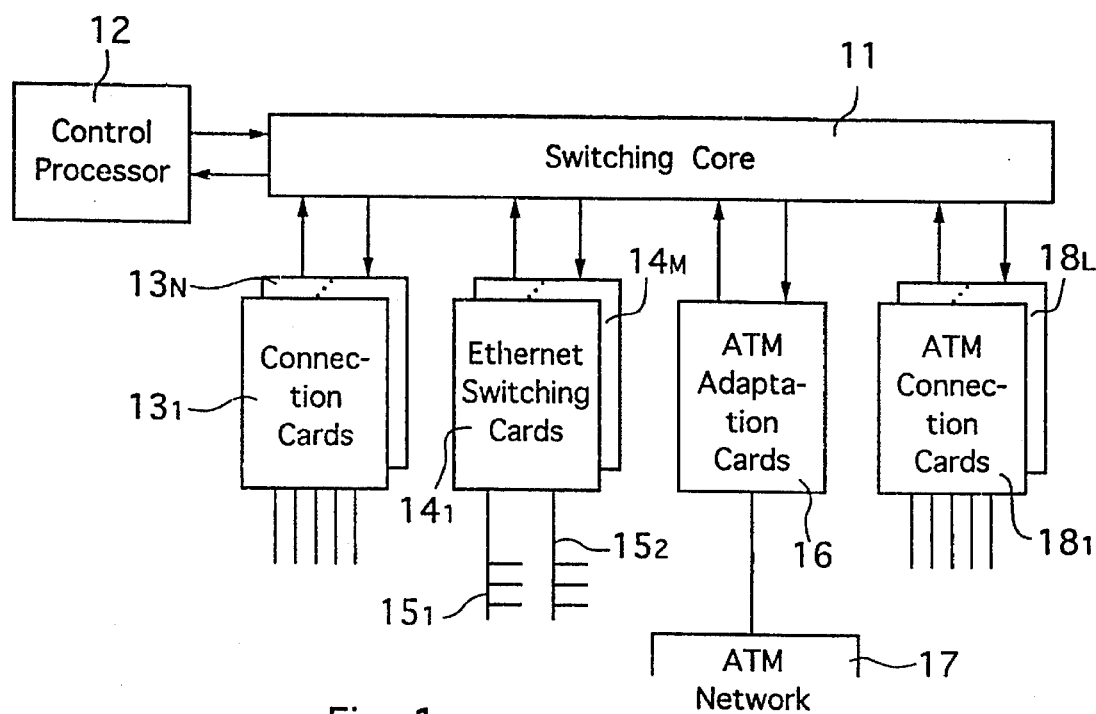
FIG. 1 gives an example of a high speed communication system implementing the device in the invention.

This device, hereafter to be called the high speed platform or switching core, is particularly intended to be the central element of a company network offering multiple functions, as is illustrated in FIG. 1.

In effect FIG. 1 gives an example of implementation of the switching core 11 of the invention, given, of course by way of a simple example of application. This switching core, the setting up and operation of which are presented in detail below, would constitute a telecommunications 'turntable' in a company.

In the described mode of realization, the switching core 11 enables 4 to 16 cards to be connected. These cards may either be high speed telecommunications cards (ATM, Frame Relay, ...) or cards for coupling up with existing sub-systems or those available on the market (card for adapting to an EISA bus for example).

In particular, it may interconnect the following applications cards:

a control processor 12 including for example a mother card and possible subsidiary network cards;

connection cards $13_1$ to $13_N$ supporting for example X25, HDLC, Frame relay type cards ...;

'Ethernet' (trademark) type $14_1$ to $14_M$ switching cards enabling different Ethernet $15_1$, $15_2$ segments to be interconnected locally;

an ATM 16 card offering access to an ATM 17 network, enabling the system to be linked to an ATM network (private or public);

ATM $18_1$ to $18_L$ connection cards enabling connection of native ATM terminal equipment.

The essential characteristics of this switching core 11 are as follows:

it constitutes an asynchronous switching system of packets of variable size (obviously enabling fixed size packets to be switched);

the technology used is crossbar switching based on a crossbar matrix which simultaneously creates N physical paths along which transfers are effected at 320 Mb/s;

the linking capacity of the switching core is 4 to 16 cards, that is a pass band of 150 Mb/s full duplex per card and a total system capacity in the order of 4 Gb/s.

To its advantage, security is provided for the switching core by doubling the matrix and associated components.

Each card is connected to the matrix by two monodirectional data exchange buses:

an input bus to the matrix, a output bus from the matrix.

The switching matrix is capable of connecting any input bus with any output bus thus creating a physical path (input bus, matrix, output bus) between an input card and an output card.

The latter may for example be created with two standard components, such as the LSI (trademark) Logic L64270 Crossbar matrix, which has 64 outputs, operates up to 40 MHz and can switch a bus in 50 ns.

The creation and release of connections is managed by an arbitration and command system. For a system N cards, up to N connections may be created simultaneously (no blocking on input). On a physical path the input card may transmit a block of information of variable size (packet). A connection is only maintained during the transfer of the packet.

Figure 2:
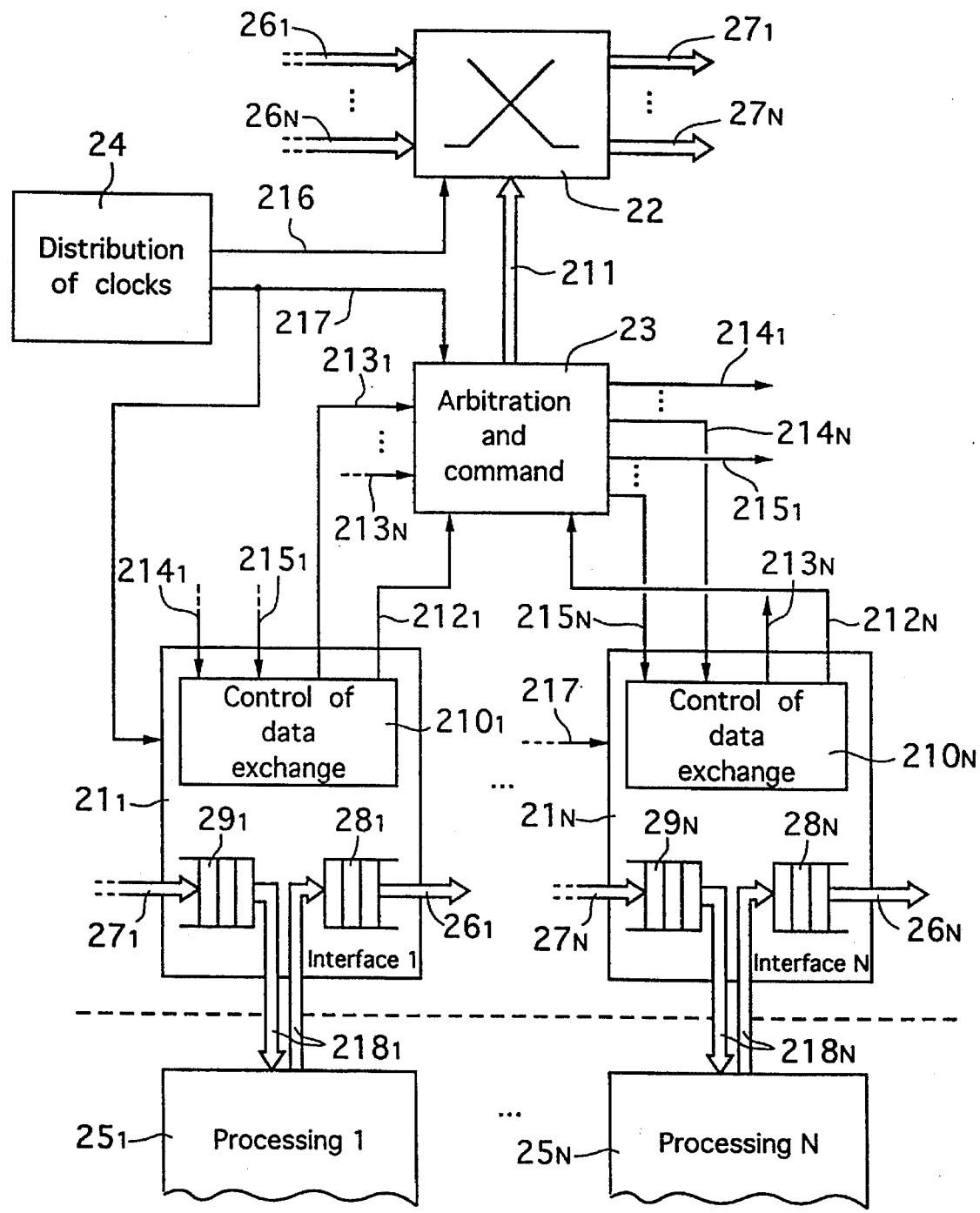
FIG. 2 illustrates the general structure of the device in the invention, such as is implemented in the system in FIG. 1.

FIG. 2 illustrates the essential characteristics of the switching core according to the invention.

Functionally, it may be broken down into four types of elements:

a multiplicity of switching interface modules, or a matrix interface card, $21_1$ to $21_N$, which controls transfers data with processing card $25_1$ to $25_N$ associated with it (to switching interface $218_1$ to $218_N$), requests the creation and release of connections and controls the transfer of data by means of the switching matrix 22.

a switching module or matrix 22, which creates the connection of input bus $27_1$ to $27_N$ and output bus $26_1$ to $26_N$ under the control of the arbitration and command module 23 and switches the data from input card $25_1$ to output card $25_N$.

an arbitration and command module 23, which receives requests for creating and releasing connections made by matrix interface cards $21_1$ to $21_N$, arbitrates the requests and controls switching of matrix 22.

a clock distribution module 24, which supplies the time base required for the other functional blocks.

According to the invention, each matrix interface card $21_i$ includes an FIFO input memory (First In First Out) $28_i$ and an output FIFO memory $29_i$. Each of these memories is designed to receive several packets of data.

When a processing unit $25_i$ wishes to transmit a packet of data to the processing unit $25_N$, the processing unit $25_i$ inscribes it the packet of data in the input memory $28_1$. The interface module 21 $_1$ includes a command module $210^1$ for data exchange, which warns arbitration and command module 23 of the presence of a packet to be transmitted, giving the arbitration and command module 23 details of the address of the destination unit $25_N$.

Having checked that the destination unit $25_N$ has sufficient space in its output memory $29_N$, the arbitrating and command module 23 guides matrix 22, via a command bus 211, in such a way that the matrix 22 connects input bus $26_1$ to output bus $27_N$.

Once the connection is made, the packet is transferred, and inscribes in output memory $29_N$.

The presence of two memories, input and output respectively, is a new characteristic of the invention, which strongly limits the risk of blocking compared to already known systems. In fact, the latter only have input memories. Therefore, there are blockages as soon as the destination processing unit has received a packet and has not finished processing. On the other hand, the presence of the FIFO output memory $29_i$ in accordance with the invention enables packets to be transferred even when the processing unit is not available (obviously within the limits of the output memory).

These FIFO memories therefore play an important role in adapting speed, the transfer speed of packets to the switching interface being controlled by processing cards, whereas the switching of packets is effected at the frequency of matrix 22.

According to another essential characteristic of the invention, arbitration of the connections, for example in the event of one or several processing units wanting to simultaneously transmit data to the same destination, is effected by a single arbitration and command module 23. Requests (requests for connection) are issued by the various interface cards $21_i$ on a request bus $212_i$. This request bus $212_i$ is made up of a single wire along which a request (comprised essentially of the destination address) is transmitted in series.

The use of such a single wire bus limits the complexity of the connections, particularly in relation to the method described in the aforementioned DuBois and Rassure document.

Upon receiving a request from a transmitting card $25_1$, arbitration and command module 23 checks that the destination card $25_N$ is ready to receive data, which means that the arbitration and command module 23 checks that there is room in the output memory $29_N$ of the designation card $25_N$. To this end, each card $21_i$ is linked to arbitration module 23 by means of a monodirectional release bus $213_1$ to $213_N$. Module $210_i$ of each card $21_i$ indicates via this bus $213_i$ whether or not card $21_i$ is ready to receive data.

If card $21_N$ is ready to receive data, the arbitration and command module 23 guides the matrix 22 via a command bus 211 in such a way that the corresponding switching is effected, and informs the transmission card $21_1$ and the destination card $21_N$ that the exchange of data can take place.

In order to do this, each card $21_i$ is linked to the arbitration and command modules by two other monodirectional buses:

an input connection bus $214_i$, on which arbitration and command module 23 informs a transmission bus that it can transmit;

an output connection bus $215_i$, on which arbitration and command module 23 informs a destination bus that it is going to receive data.

As described below, these connection operations are advantageously effected in pipeline mode.

The information relating to input and output connections is transmitted simultaneously, in such a way as to synchronize the beginning of the transfer.

When the arbitration and command module 23 simultaneously receives several requests (all interface cards being able to transmit a request at the same time), it selects a request to respond to according to an appropriate arbitration procedure.

It should be noted that according to the described system, all the buses ($26_i$, $27_i$, 211, $212_i$, $213_i$, $214_i$ and $215_i$) are monodirectional, which enables the control of signal exchanges to be simplified.

Furthermore, according to the special system of the invention which is described, the different switching core modules are selectively guided by two clocks 216 and 217 distributed by the clock distribution module 24.

More precisely, switching module 22 operates at a higher speed in a first clock 216 (for example 40 MHz, which corresponds to an output of 320 Mb/s) than that of in a second clock 217 of the maximum input rate (for example 150 Mb/s) and than that of the arbitration and command module 23.

Thus, the clock distribution module 24 advantageously delivers the first clock 216 at frequency f (for example 40 MHz) to matrix 22 and the second clock 217 at frequency f/2 (for example 20 MHz) to the arbitration and command module 23 and to each of the interface modules $21_1$ to $21_N$.

Figure 3:
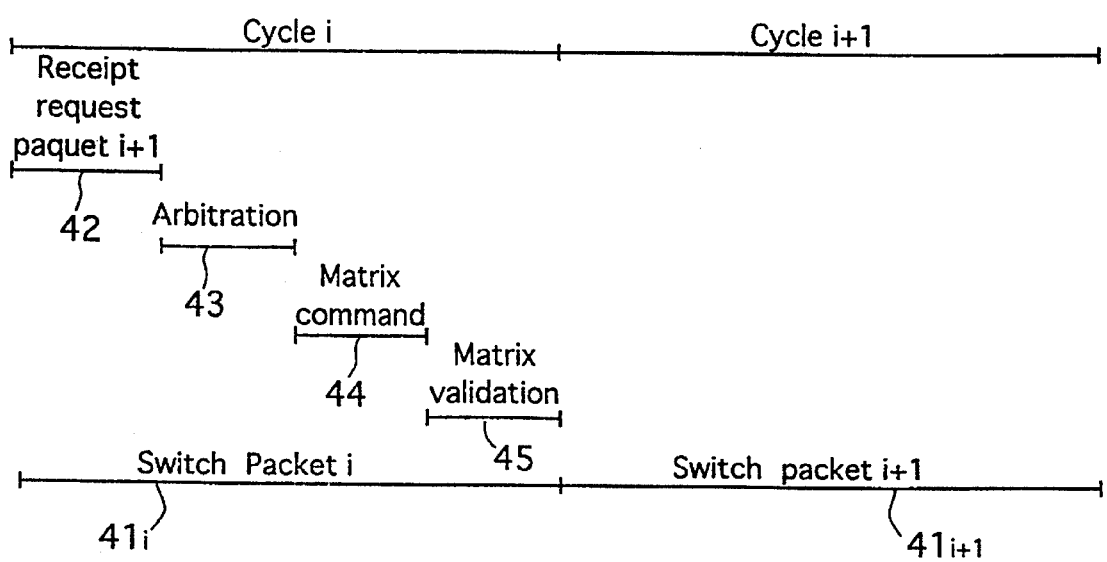
FIG. 3 illustrates the principle of pipeline operation of the arbitration module of the device shown in FIG. 2.

In order to reduce the transfer time, the arbitration and command module 23 advantageously operates in pipeline mode, as is illustrated in FIG. 3. This technique enables the parallelization (at two levels) of the mechanisms which set up the connections; whilst packet i is being switched $41_i$, preparation for initiating the switching of packet i+1 begins.

According to an advantageous method of producing the system, a switching cycle $41_i$ or $41_{i+1}$ corresponds to the transmission of a 64 octet packet (considering the case of an 8 bit parallel input and output bus). The arbitration and command module 23 functioning at a half the frequency of that of the matrix 22, a cycle is divided into 32 units of time. This division may for example be effected in the following manner:

receipt 42 of requests transmitted by all the matrix interface cards: 8 units of time;

the actual arbitration 43:2 units of time;

command of the matrix: 16 units of time;

validation 45 of the matrix commands: 2 units of time; giving a total of 28 units of time, which is compatible with the 32 units available.

If the matrix operates at 40 MHz an output of 320 Mbits/s is obtained per card in each direction, so for a device capable of switching 16 cards, an overall speed in the order of Gbits/s is obtained.

There are other uses of the pipeline technique especially if each bus is parallelized on 16 or 32 bits (which enables the duration of a cycle to be reduced). We could for example have a three level pipeline carrying out the following simultaneously:

request for switching packet i;

arbitration of the requests from packets i–1;

switching packets i–2.

The use of the pipeline technique favors exchanges of fixed size packets, corresponding to the duration of a cycle. However, the transmission of longer packets is still possible on several consecutive cycles. In this instance the arbitration and command module 23 systematically maintains the switching of the matrix, 22 in such a way that the transfer of the whole packet is effected. The packet is divided into segments corresponding to the duration of a cycle.

Advantageously, each segment carries information specifying whether or not it is the last segment in a packet. Thus, so long as it has not detected this information, the destination interface module does not transmit any release information (bus $213_i$), and switching is maintained. No intervention in respect of the arbitration and command module 23 is necessary, although the duration of the packet exceeds that of a cycle.

The system set thus is particularly effective both for fixed size packets (the size of which corresponds to a segment), and simple and safe use of longer packets transmitted on several segments.

Figure 4:
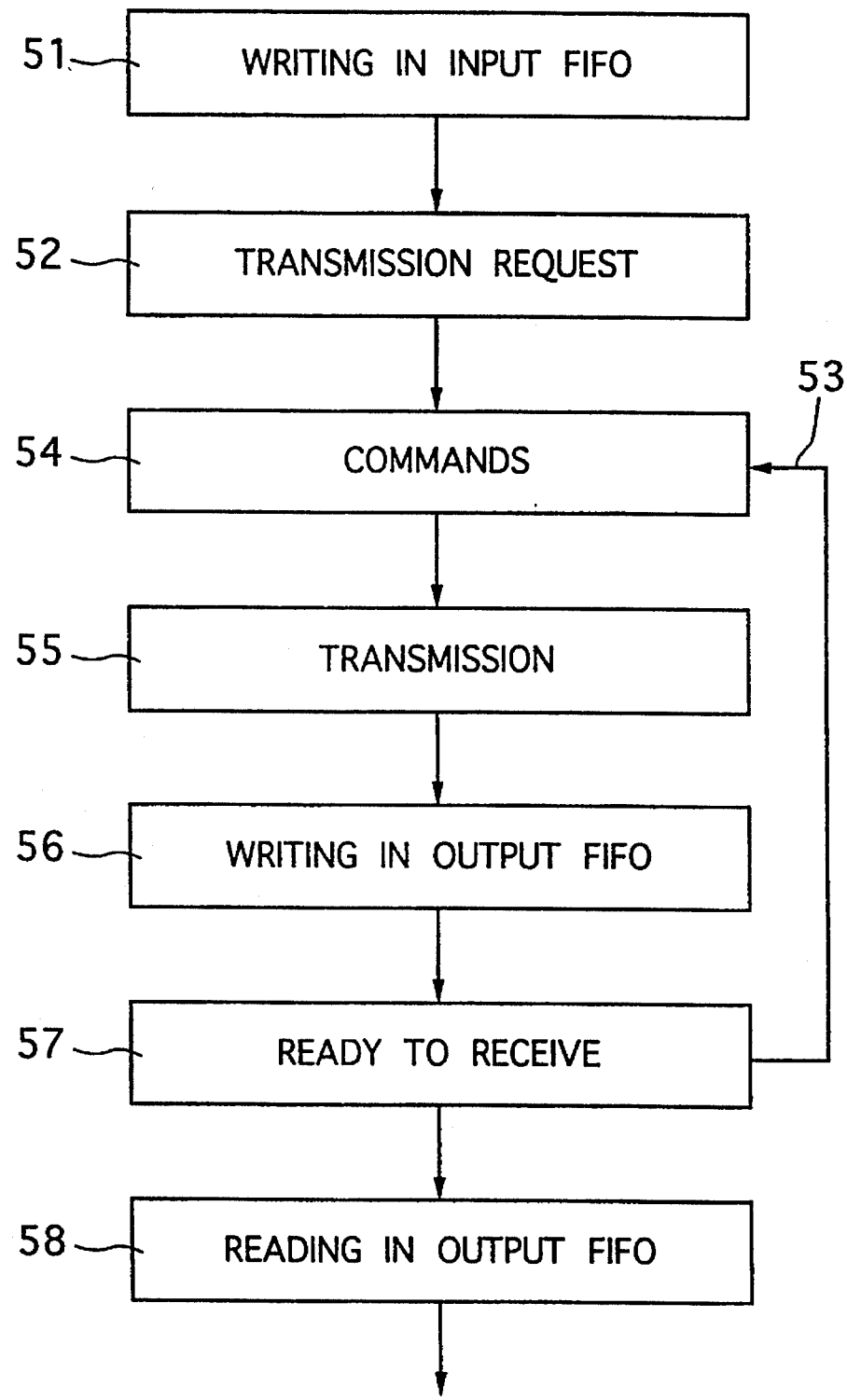
FIG. 4 is a diagram illustrating the main stages in the procedure of the invention, such as implemented in the device shown in FIG. 2.

The invention also relates to the switching procedure used in the device described above. FIG. 4 illustrates the general principle of this procedure.

In step 51, a processing card $25_i$ transmits a packet to be switched to the interface card $21_i$ linked to the processing card $25_i$. The interface card memorizes the packets whilst awaiting switching in its FIFO input memory $28_i$.

With regard to the packet at the head of the wire, in step 52, the interface card transmits a request for a connection to be set up with the destination interface card $25_i$ (for example, $25_N$) to the arbitration and command module 23. When this destination card $25_i$ is ready to receive in step 53, the arbitration and command module (23) actuates the connection of the matrix 22 and indicates to the matrix 22 the destination and transmitting interface cards $25_i$ in step 54.

Once the connection has been made, the packet is transmitted in step 55 at maximum speed. In step 56, the packet is received on the output bus $27_i$ of the destination card $25_i$ and memorized in the FIFO output memory.

At the end of the transfer, in step 57 and when the rate of filling the FIFO memory allows it, the destination interface card $25_i$ indicates to the arbitration and command module 23 that it is once again ready to receive a new packet.

Several packets may be present in the FIFO output memory $27_i$, awaiting withdrawal by the processing card $25_i$. The processing card $25_i$ extracts the packets at its own rhythm in step 58.

Apart from the essential characteristics of the invention described previously, the procedure may offer numerous secondary benefits.

Thus, the arbitration and command module 23 may control several levels of priority of switching requests, the higher priority requests being serviced by the switching core 11 before the other requests. This enables the average time taken to switch priority packets to be reduced (obviously to the detriment of lower priority packets).

The switching core 11 may, for example, offer two levels of priority. The level of priority indicated by a processing card with each packet is transmitted to the switching core 11.

Semi-permanent connections may also be offered. The connections are normally set up for the duration of a transfer. However, it may be useful for certain applications, to set up semi-permanent connections, programmed, for example upon initialization of the system and not modified very often. For this type of application, the setting up and release phase of the connections may be initiated by a card other than the original card, for example by a control centralized card, thus enabling economies to be made in the logic of management of the requests on these cards.

It is also possible to distribute these packets. When an input from the switching matrix is successively switched to several outputs, the information presented at this input is transmitted to each of the outputs. This characteristic may be used to distribute a packet to several destination cards. This function may be managed initiated either by the request management logic (several request packets transmitted successively) or by the arbitration logic (a single address indicating a distribution address).

The invention also relates to the mechanical installation of the elements of which the invention is composed, In fact, at very high speeds, the distances between the different cards may cause crucial time gaps. Thus, 10 cm corresponds to a transfer time in the order of 1 ns.

Figure 5:
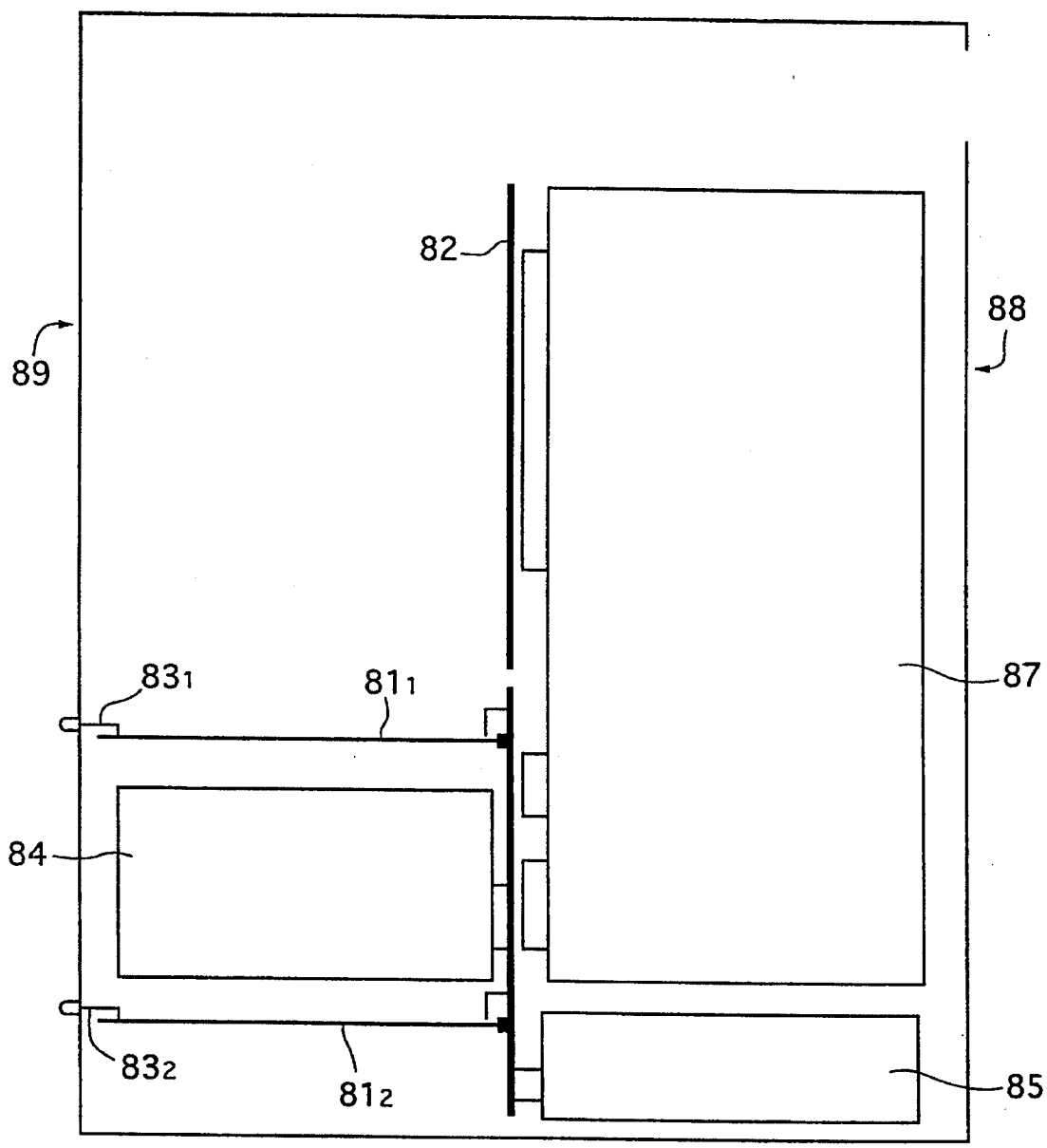
FIG. 5 illustrates an example of the mechanical implementation of the device in FIG. 2.

The mechanical layout in accordance with the invention consists of placing the different processing cards at more or less equal distances from the switching core, as is illustrated in FIG. 5, in the case of a unit of cards being mounted on a pan base 82.

FIG. 5 shows the profile of the mechanical layout. The matrix cards $81_1$ and $81_2$ are placed perpendicular to the pan base 82, and the electroluminescent diodes $83_1$, $83_2$ are placed in a row being visible through the cover on the front 89. It is possible for the operator to carry out interventions (access to the switches on the matrix cards) by removing the cover.

The free volume between the two matrix cards $81_1$ and $81_2$ is used for two power blocks 84 which are plugged into the pan base 82. A fan 85 located on the power blocks ventilates the front section.

The volume 86 located to the front of the pan base 82 is left free. This provides easy access for fixing the modular pan base cards. This volume may also be used for housing additional cards behind the application cards 87 which are placed at the side of the front 88.

Thus, application cards are perpendicular to the matrices. In this way, numerous cards may be connected to each matrix at more or less equal distances.

We claim:

1. A high speed switching device among a multiplicity of processing modules for enabling exchanges of data organized into protocol units, comprising:

a multiplicity of switching interface modules each including a FIFO input memory connected to an input bus and a FIFO output memory connected to an output bus, each of the memories including at least one space which is able to contain one of the protocol units, and data exchange controlling means, each of the switching interface modules being capable of being connected to one of the processing modules, in such a way that the processing module may inscribe data in the input memory and read data in the said output memory;

a switching module, capable of connecting each of the input buses with each of the output buses;

an arbitration and command module commanding switching effected by the switching module, as a function of requests received from the data exchange controlling means in the switching interface modules, and the arbitration and command module delivering corresponding connection commands to the date exchange controlling means once switching has been effected;

the data exchange controlling means from one of the switching interface modules transmitting a request, which indicates at least one destination switching interface module, to the arbitration and command module once the protocol unit has been inscribed in the input memory; and the arbitration and command module commanding a corresponding switching once the output memory of the destination switching interface module has at least one free place.

2. A high speed switching device according to claim 1, wherein each of the switching interface modules is linked to the arbitration and command module by:

an input connection bus, by which the arbitration and command module indicates to a switching interface module which has transmitted a transmission request that a corresponding switching has been effected;

an output connection bus, by which the arbitration and command module indicates to a destination switching interface module that is going to receive a protocol unit;

a release bus, by which the destination switching interface module indicates to the arbitration and command module that the protocol unit has been received;

a requests bus, by which a switching interface module transmits a request, including an address of the destination switching interface module, to the arbitration and command module.

3. A high speed switching device according to claim 2, wherein the requests bus includes a single wire, on which binary elements which make up the request are transmitted in series.

4. A high speed switching device according to claim 1, wherein the arbitration and command module implements a processing pipeline, arbitration of switching a current protocol unit being effected simultaneously to transfer of a preceding protocol unit.

5. A high speed switching device according to claim 4, further comprising time means for dividing time into switching cycles, duration of a cycle corresponding to duration of a protocol unit of predetermined size, the arbitration and command module includes:

means for receiving requests;

means for arbitrating connections for a following cycle;

means for transmitting switching commands for the following cycle to the switching module; and means for validating switching commands.

6. A high speed switching device according to claim 1, wherein the input buses and output buses are eight, sixteen or thirty-two bit parallel buses.

7. A high speed switching device according to claim 1, wherein each of the processing modules is implanted on a separate switching interface support card, and the switching module is implanted on a switching support card, and the switching interface support cards and the switching support cards are grouped in such a way that a distance between each of the switching interface support cards and the switching support card are substantially identical.

8. A high speed switching device according to claim 7, wherein the switching interface support cards are substantially perpendicular to each other, and the switching interface support cards are substantially perpendicular to the switching interface support cards.

9. A method of high speed switching among a multiplicity of processing modules, for enabling exchange of data organized into protocol units, comprising the steps of:

writing a protocol unit to be transmitted, by a transmitting processing module, into a FIFO input memory of an initial switching interface module linked to the transmitting processing module;

transmitting a connection request which specifies an address of a destination processing module to a single arbitration and command module;

when the destination processing module is available, commanding the arbitration and command module of a switching module, in such a way that the switching module connects an input bus connected to the FIFO input memory to an output bus connected to a FIFO output memory of a second switching interface module which is linked to the destination processing module;

transmitting a transfer command to the transmitting processing module and destination processing module by the arbitration and command module;

transferring the protocol unit in the FIFO output memory of the second switching interface module; and transmitting release information by the second switching interface module to the arbitration and command module, once transfer has been effected and when there is sufficient space in the FIFO output memory of the second switching interface module for at least one protocol unit.

10. A method of high speed switching according to claim 9, wherein the connection request in the step of transmitting the connection request is effected in series, on a single wire requests bus.

11. A method of high speed switching according to claim 9, further comprising a step of implementing a pipeline processing procedure, arbitration of switching of a protocol unit being effected simultaneously to transfer of a preceding protocol unit.

12. A method of high speed switching according to claim 11, wherein time is divided into switching cycles, duration of a cycle corresponding to duration of a segment corresponding to a protocol unit of predetermined size.

13. A method of high speed switching according to claim 12, wherein each segment carries information indicating whether or not said each segment is a last segment in a series of segments forming a protocol unit, a connection is systematically maintained for a following cycle when a current segment being transferred is not the last segment, and release information is transmitted when the last segment has been received and when the output memory has sufficient space to receive a new protocol unit.

* * * * *